US012503262B2

(12) United States Patent
Spreafico

(10) Patent No.: US 12,503,262 B2
(45) Date of Patent: Dec. 23, 2025

(54) APPARATUS FOR MAKING CAPSULES AND RELATIVE METHOD FOR MAKING CAPSULES

(71) Applicant: I.M.A. INDUSTRIA MACCHINE AUTOMATICHE S.P.A., Ozzano Dell'Emilia (IT)

(72) Inventor: Enrico Davide Spreafico, Garlate (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 0 days.

(21) Appl. No.: 18/856,991

(22) PCT Filed: May 4, 2023

(86) PCT No.: PCT/IB2023/054630

§ 371 (c)(1),
(2) Date: Oct. 15, 2024

(87) PCT Pub. No.: WO2023/223136

PCT Pub. Date: Nov. 23, 2023

(65) Prior Publication Data

US 2025/0256876 A1 Aug. 14, 2025

(30) Foreign Application Priority Data

May 16, 2022 (IT) ........................ 102022000010010

(51) Int. Cl.
*B65B 29/02* (2006.01)
*B26D 3/08* (2006.01)
(Continued)

(52) U.S. Cl.
CPC .............. *B65B 29/022* (2017.08); *B26D 3/08* (2013.01); *B65B 5/02* (2013.01); *B65D 85/8064* (2020.05)

(58) Field of Classification Search
None
See application file for complete search history.

(56) References Cited

U.S. PATENT DOCUMENTS 10,138,007 B2 * 11/2018 Rubbi .................. B65B 29/022
10,800,562 B2 * 10/2020 Baraccani ................ B65B 1/14
(Continued)

FOREIGN PATENT DOCUMENTS

WO WO-2018069328 A1 * 4/2018 .......... B65B 51/225
WO 2022029551 A1 2/2022

OTHER PUBLICATIONS

International Search Report dated Aug. 21, 2023 from counterpart PCT App No. PCT/IB2023/054630.
(Continued)

*Primary Examiner* — Tanzim Imam
(74) *Attorney, Agent, or Firm* — SHUTTLEWORTH & INGERSOLL, PLC; Timothy J. Klima

(57) ABSTRACT

An apparatus for making capsules, includes: a receiving station for receiving capsule bodies having bottom and side walls defining a filling cavity with an opening opposite the bottom and a flange surrounding the opening. A forming station for making sealing rings includes a device for feeding a sheet from a reel. A coupling station couples each ring to a capsule body at the respective flange. A welding station welds the rings to respective capsule bodies. Groups of receiving seats receive the capsule bodies. An etching device etches pre-cutting lines along the edges of the rings, so that a central portion of the rings is detached from the etched sheet. Detaching elements detach from the sheet the rings that had been etched onto the sheet and bring them into contact with the flange at the coupling station. The etching device operates remotely and separately from the coupling station.

14 Claims, 16 Drawing Sheets

(51) Int. Cl.
*B65B 5/02* (2006.01)
*B65D 85/804* (2006.01)

(56) References Cited

U.S. PATENT DOCUMENTS

| | | | | |
|---|---|---|---|---|
| 2016/0009427 | A1* | 1/2016 | Rea | B65B 35/18 53/282 |
| 2016/0176555 | A1* | 6/2016 | Castellari | B65B 35/02 53/167 |
| 2023/0271734 | A1* | 8/2023 | Negrini | B65B 29/022 53/478 |

OTHER PUBLICATIONS

Anonymous: "etch, v.2 Oxford English Dictionary", Jan. 3, 2023 (Jan. 3, 2023), pp. 1-3, XP093011259, retrieved from the Internet: URL:https://www.oed.com/view/Entry/64677?rskey=43pinX&result=4&isAdvanced=false&print [retrieved on Jan. 3, 2023] p. 1.

* cited by examiner

Fig.10A
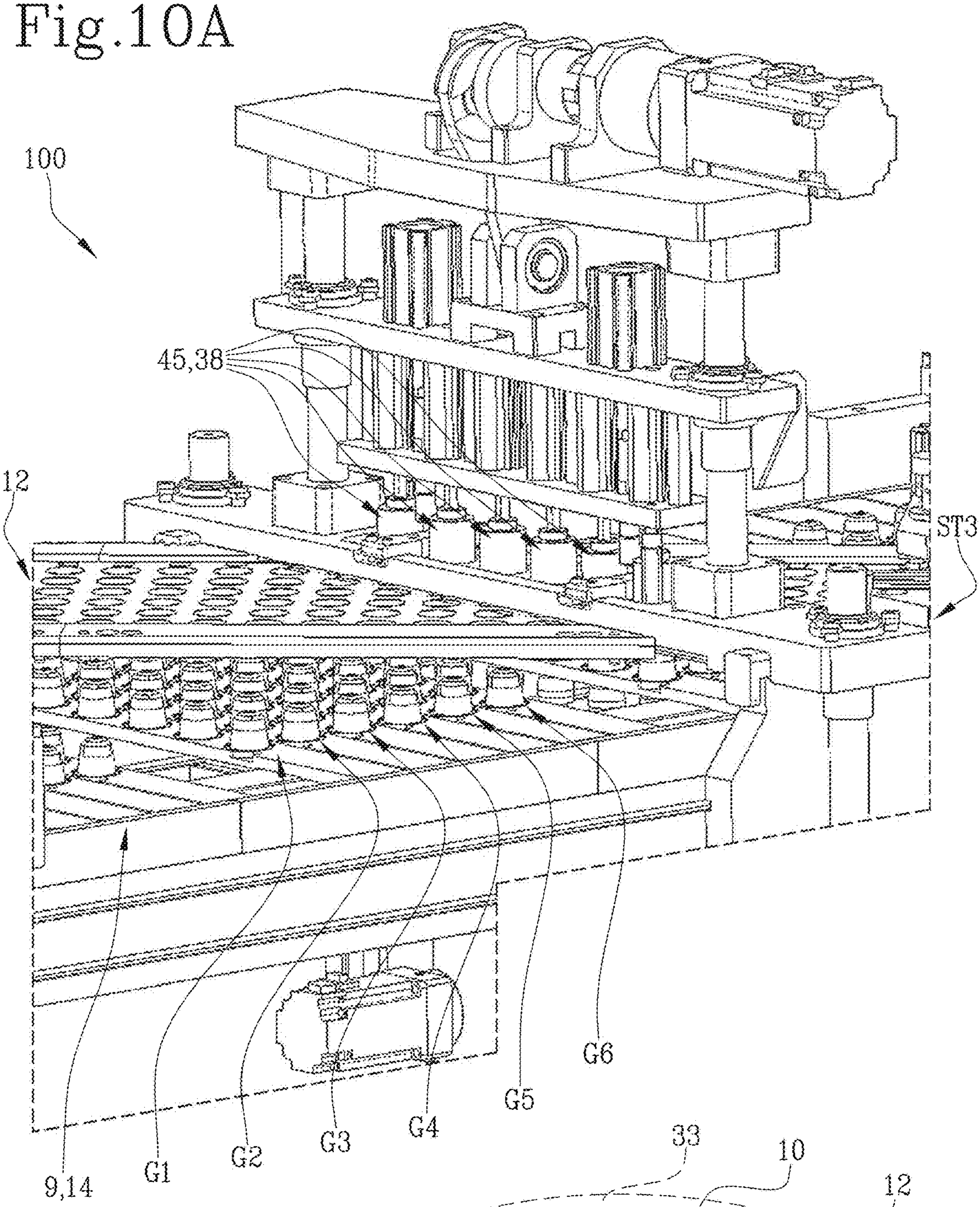
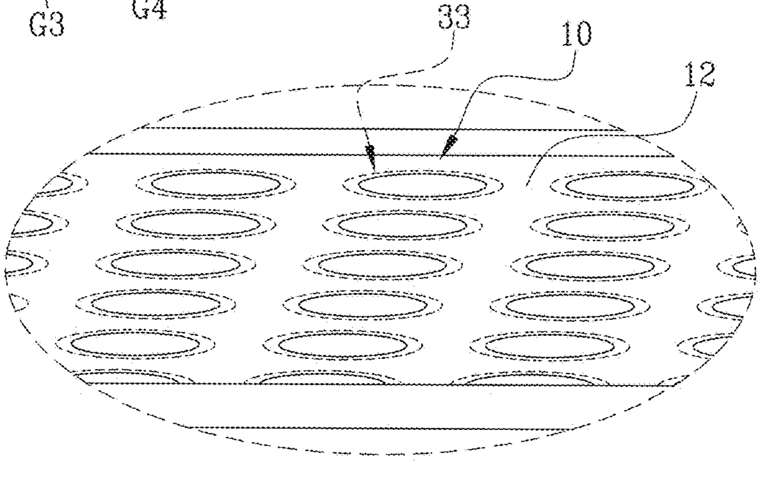
Fig.10B

APPARATUS FOR MAKING CAPSULES AND RELATIVE METHOD FOR MAKING CAPSULES

This application is the National Phase of International Application PCT/IB2023/054630 filed May 4, 2023 which designated the U.S.

This application claims priority to Italian Patent Application No. 102022000010010 filed May 16, 2022, which application is incorporated by reference herein.

TECHNICAL FIELD

This invention relates to an apparatus for making capsules and a relative method for making capsules.

BACKGROUND ART

In the food sector, the prior art teaches the making of capsules or containers, containing a food preparation, which can be used in machines for dispensing a beverage.

Generally speaking, these capsules are made from a sheet of aluminium foil or other deformable material, which is cut and suitably deformed to define a space for containing the product, and to constitute an outer case.

According to an alternative technique, the capsules may be made by means of a process for injecting material.

The case has a bottom wall, a lateral wall which define a cavity and a peripheral flange.

It should be noted that the product is housed inside the cavity and that the capsule has an opening on the opposite side relative to the bottom wall.

After inserting the product, through the opening, the prior art comprises closing the opening, in a hermetically sealed fashion, using a sheet of aluminium or multilayer plastic film, thereby sealing the product inside the cavity.

A problem encountered in the capsules made starting from a sheet of aluminium or other material is a certain difficulty in guaranteeing the seal between the peripheral flange of the capsule and the housing of the capsule of the dispensing machine.

In effect, the flange is in the order of a few tenths of a millimetre and, therefore, having a reduced thickness, is easily deformable.

The seal is important in order to prevent percolations of the product in the dispensing machine during the preparation of the beverage, so as to also allow the production of a beverage under perfect quality conditions and keep the dispensing machine in perfect conditions of efficiency and cleaning.

In order to improve the seal of the capsule relative to the housing of the dispensing machine, a sealing element (ring) (made, for example, of elastomeric material) is generally applied to the capsule.

The sealing element generally has the shape of a ring, and is inserted on the lateral wall of the capsule in contact with the flange. When the capsule is inserted in the dispensing machine, the sealing element is flattened against a contact element of the housing of the capsule of the dispensing machine, so that deforming guarantees a certain seal.

According to the prior art machines for making capsules the sealing element is made of elastic material, and may consist of a ring inserted elastically on the lateral wall of the capsule, or fixed to the lateral wall, in contact with the surface of the flange facing the opposite side relative to the opening of the cavity of the capsule.

The ring may also be made by applying (according to different techniques) a composition of elastomers, silicones, plastic materials in a liquid or viscous form on the outer surface of the capsule, and subsequently hardening said composition.

However, the making of said annular sealing element is complex and costly, thus increasing the production costs of the capsule.

There is therefore a strongly felt need for providing an apparatus for making capsules which can, advantageously, operate with reduced costs, using environmentally-friendly materials, without adversely affecting a perfect cleaning, safety, and reliability, and at the same time allowing capsules to be made which, once used, guarantee an optimum seal with the dispensing machine.

DISCLOSURE OF THE INVENTION

An aim of the invention is therefore to satisfy the need expressed in the introduction, that is to say, to provide an apparatus and a method for making capsules for beverages which can operate with perfect cleanliness, safety and reliability.

Said aims are fully achieved by an apparatus and a method for making capsules for beverages according to the appended claims.

BRIEF DESCRIPTION OF DRAWINGS

The invention will be described with reference to the accompanying drawings, provided by way of example only and without limiting the scope of the invention, in which:

FIGS. 10A, 10B and 11 are perspective views of certain details of the apparatus of FIG. 1, more specifically a zone relative to the station for the sealing of sealing rings for capsules of the apparatus of FIG. 1;

DETAILED DESCRIPTION OF PREFERRED EMBODIMENTS OF THE INVENTION

Figure 1:
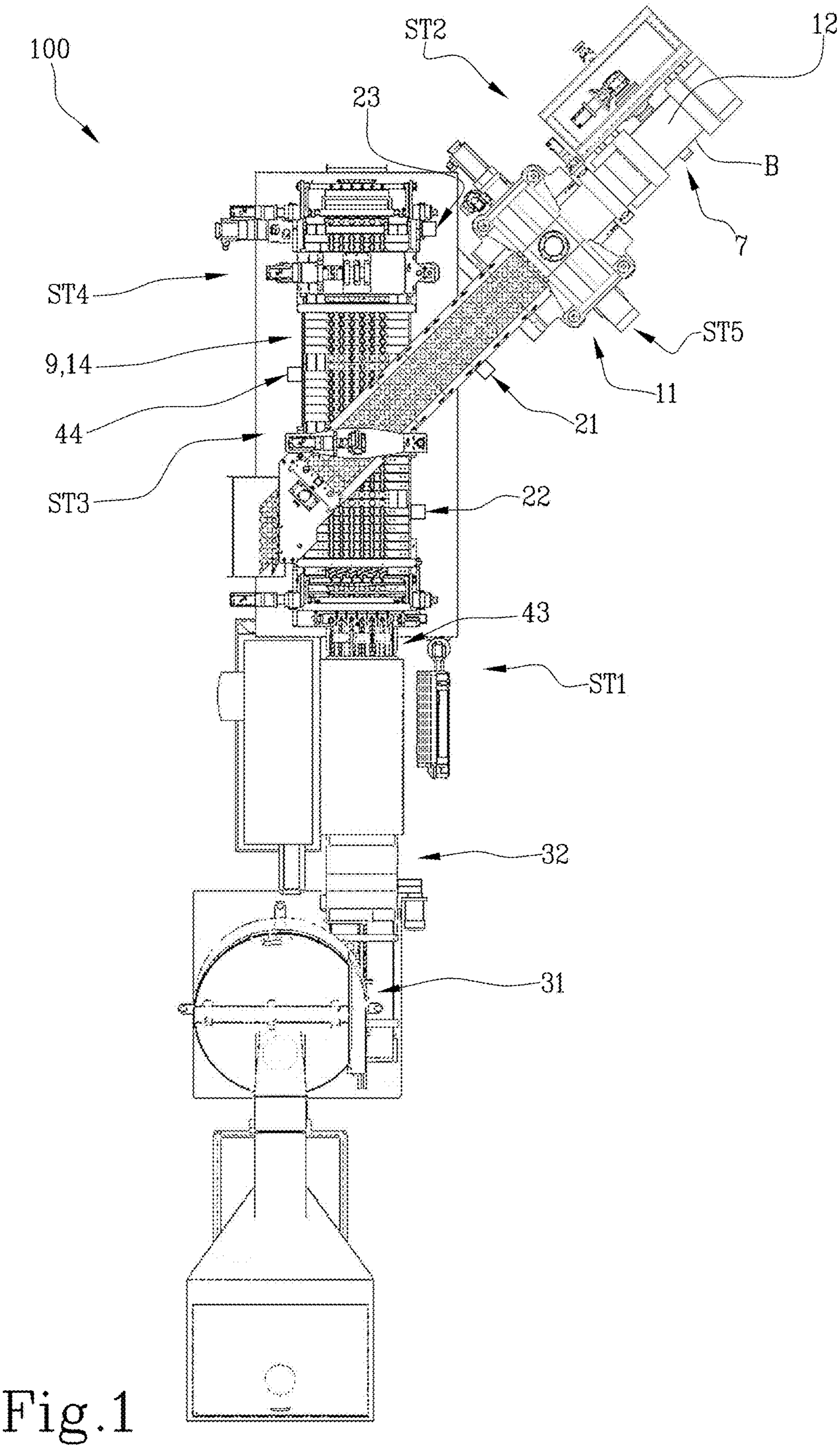
FIG. 1 is a perspective view of an apparatus for making capsules equipped with sealing rings according to the invention.
Figure 2:
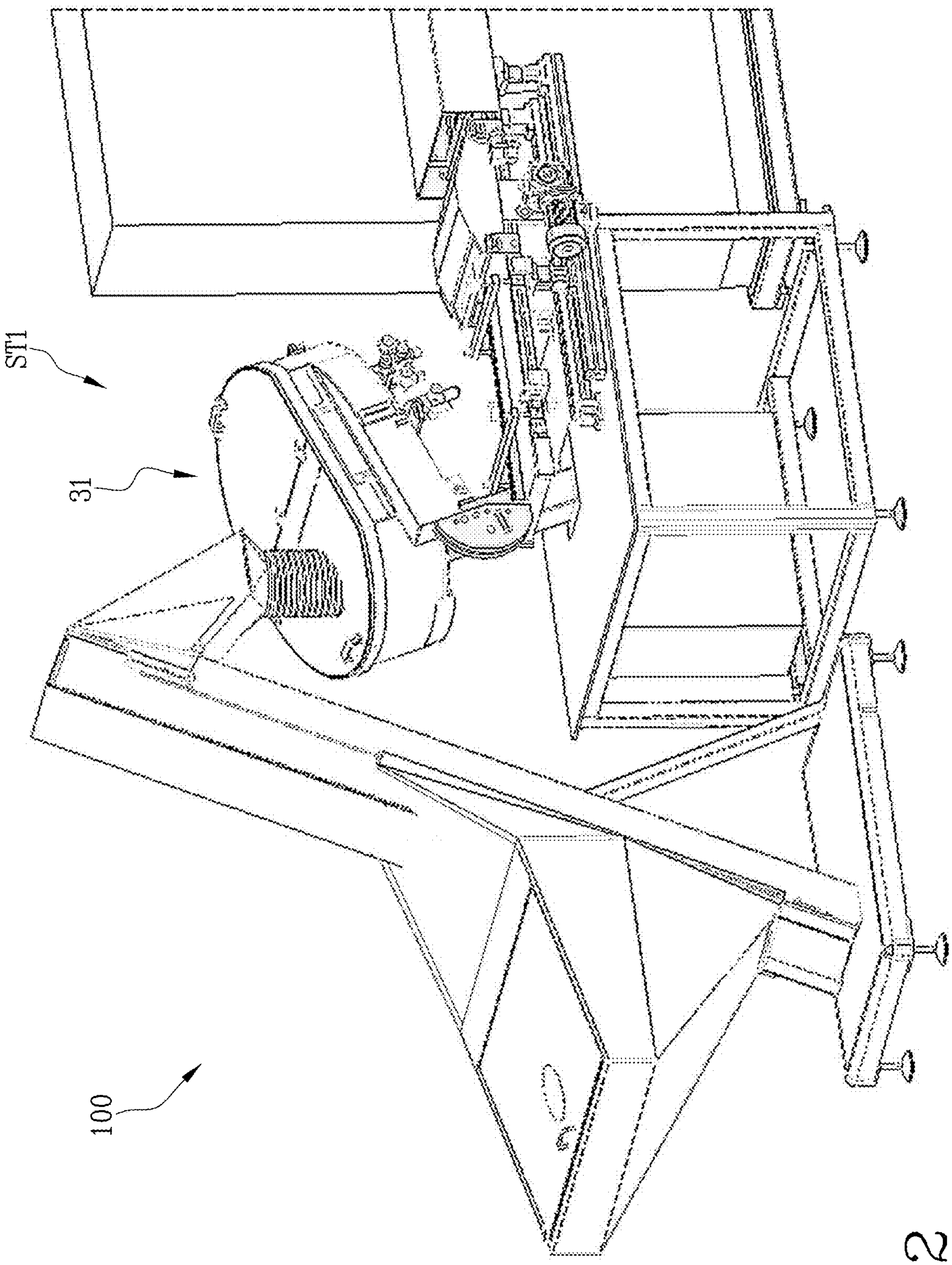
FIG. 2 is a perspective view of certain details of the apparatus of FIG. 1 relating to a first zone of the station for feeding capsules.

With reference to the accompanying drawings, and with particular reference to FIGS. 1 to 14, the apparatus according to the invention, labelled 100 in its entirety, is used for making capsules.

The apparatus 100 comprises a receiving station ST1 for receiving capsule bodies 8 having a bottom 2 and side walls 3 defining, in combination, a filling cavity 4 provided with an opening 5 opposite the bottom 2 and a flange 6 positioned to surround said opening.

Figure 15:
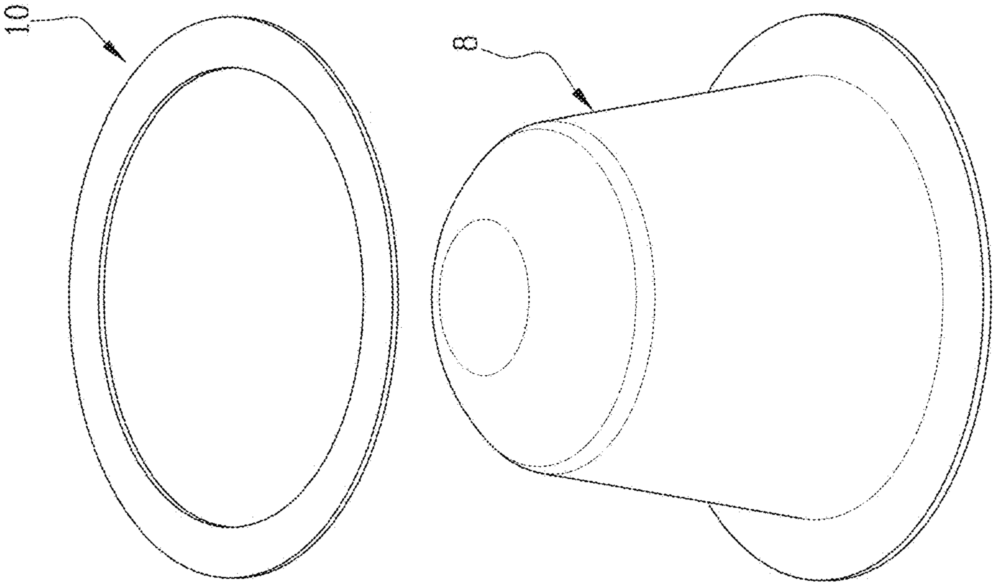

The capsule bodies 8 are well illustrated in FIG. 15.

The receiving station ST1 comprises a container 31 designed to contain capsule bodies 8 (the container 31 is filled with loose capsule bodies 8).

Figure 3:
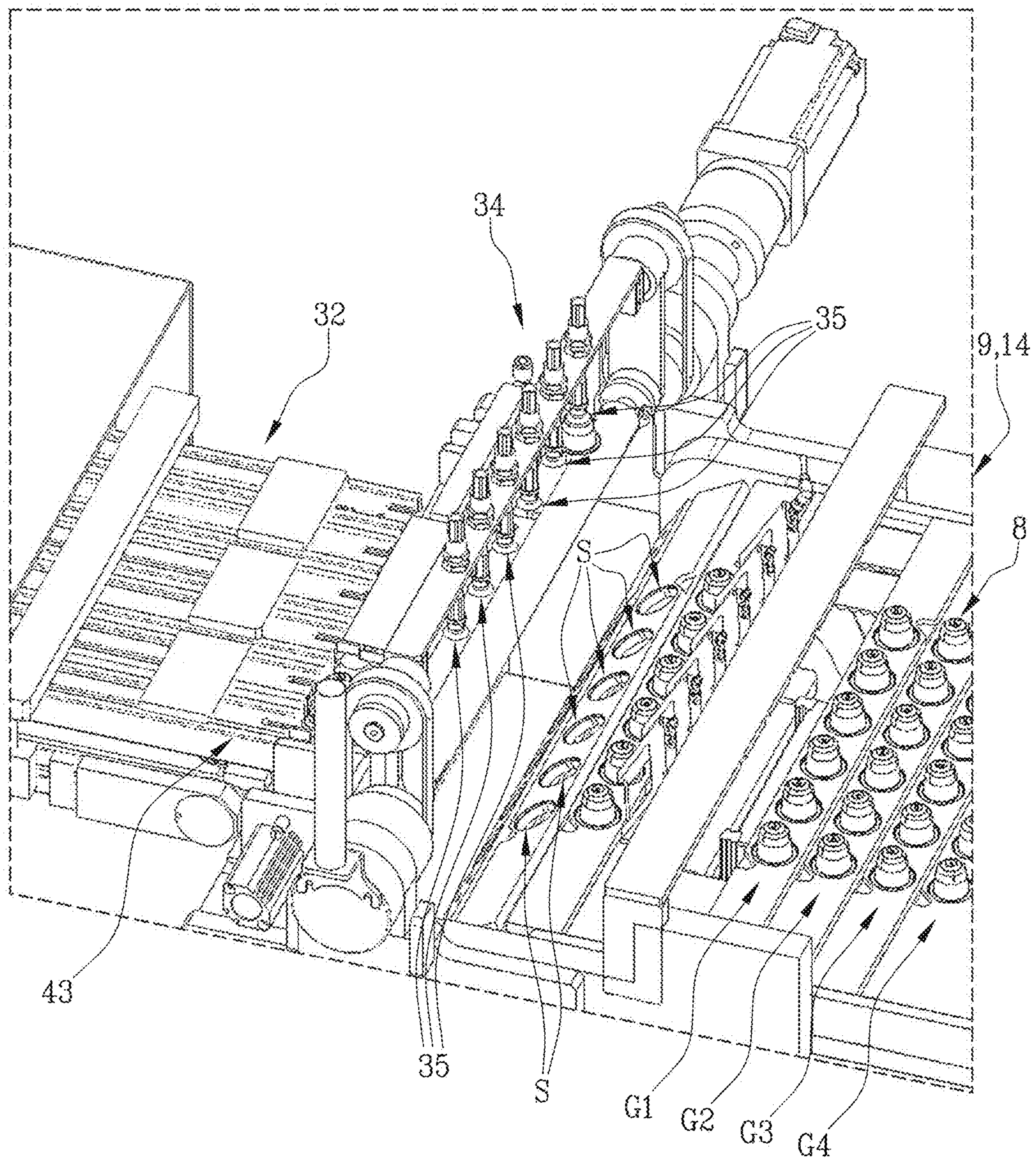
FIG. 3 is a perspective view of certain details of the apparatus of FIG. 1 relating to a second zone of the station for feeding capsules.

The container 31 releases the capsules to a conveyor 32 which suitably conveys them to a predetermined release zone 43 (shown in FIG. 3).

The apparatus 100 comprises, in the release zone 43, a pickup device 34 comprising a plurality of pickup units 35.

Each pickup unit 35 is equipped with a suction cup, to allow a single capsule body 8 to be picked up from the conveyor 32.

It should be noted that the pickup device 34 releases the capsule bodies 8 to a successive conveyor 14 (clearly visible in FIG. 4), which is described in more detail below, forming part of the apparatus 100.

Figure 6:
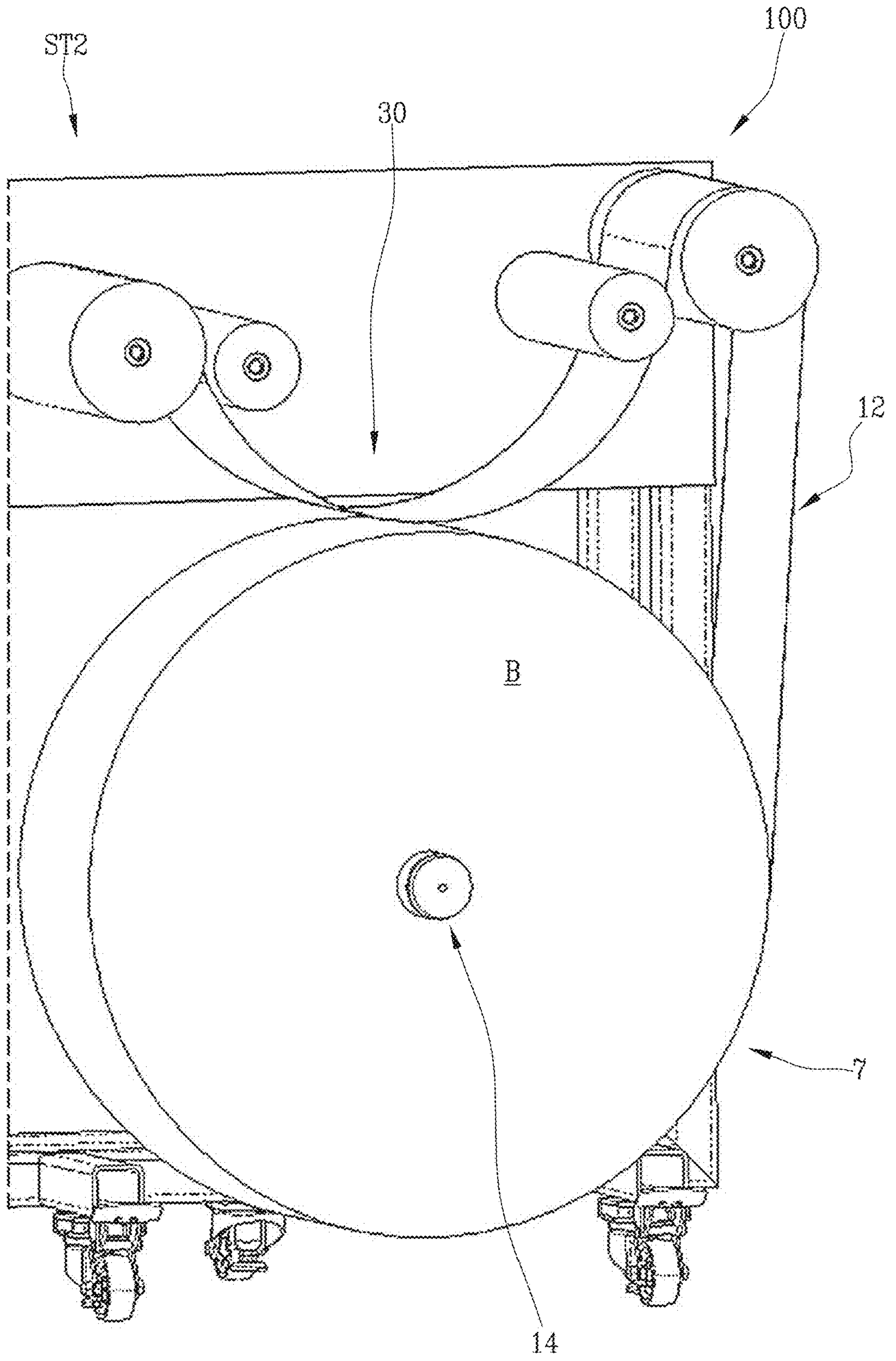
FIG. 6 is a perspective view of certain details of the apparatus of FIG. 1, more specifically a first zone relative to the station for making sealing rings for capsules of the apparatus of FIG. 1.

According to another aspect, the apparatus 100 comprises a station ST2 for making sealing rings 10 comprising a device 7 for feeding a sheet 12 unwound from a reel B (clearly visible in FIG. 6).

Preferably, the sheet 12 is made of paper material.

According to another aspect, the apparatus 100 comprises a station ST3 for coupling said sealing rings 10 with the respective capsule bodies 8 (clearly visible in FIG. 10), configured for coupling each sealing ring 10 to a capsule body 8 at the respective flange 6.

The coupling station ST3 comprises a plurality of detaching elements 38, preferably defined by punches 45, configured to detach the sealing rings 10 from the sheet 12 and position them on the flanges 6 of the capsule bodies 8 positioned at the coupling station ST3.

Figure 16:
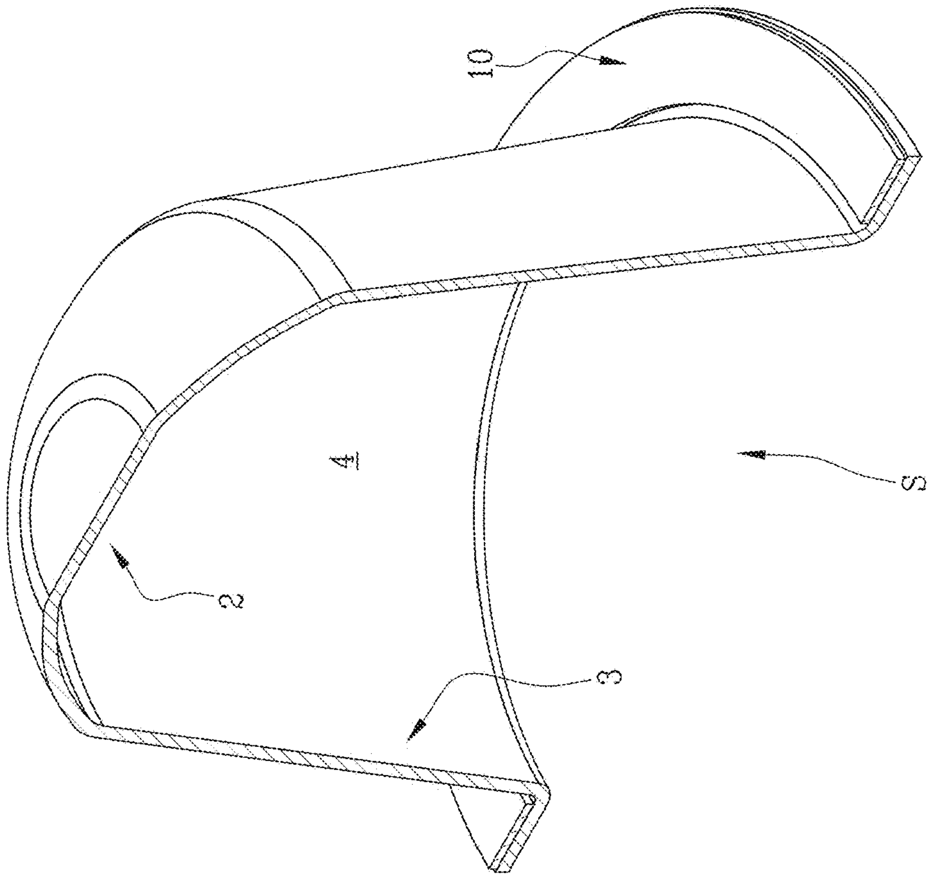
FIGS. 15 and 16 schematically illustrate a capsule according to the processing in the apparatus of FIG. 1, with the sealing ring not coupled and coupled, respectively, to the capsule body.

FIG. 16 illustrates, by way of example, a capsule body 8 with the sealing ring 10 applied.

The apparatus also comprises a sealing station ST4 (clearly visible in FIGS. 11 and 12A) designed for sealing said rings 10 to the respective capsule bodies 8.

Moreover, the apparatus 100 comprises a plurality of groups G1,G2,G3,G4,G5,G6 (for simplicity, only six groups are indicated in the accompanying drawings) of seats S for receiving said capsule bodies 8 and means 9 for handling said groups G1,G2,G3,G4,G5,G6 of receiving seats S, configured to allow a handling of the capsule bodies 8 between the station ST1 for receiving capsule bodies 8, the station ST3 for coupling said sealing rings 10 with the respective capsule bodies 8, and the sealing station ST4.

The apparatus 100 further comprises etching means 11 designed to etch the sheet 12 creating pre-cutting lines 33 along the (outer) edges of said sealing rings 10, in such a way that a central portion of the sealing rings 10 is detached from the etched sheet 12, whilst the sealing rings 12 remain anchored to the sheet 12 by means of anchor points on the sheet 12 defined by the pre-cutting lines 33.

Figure 9:
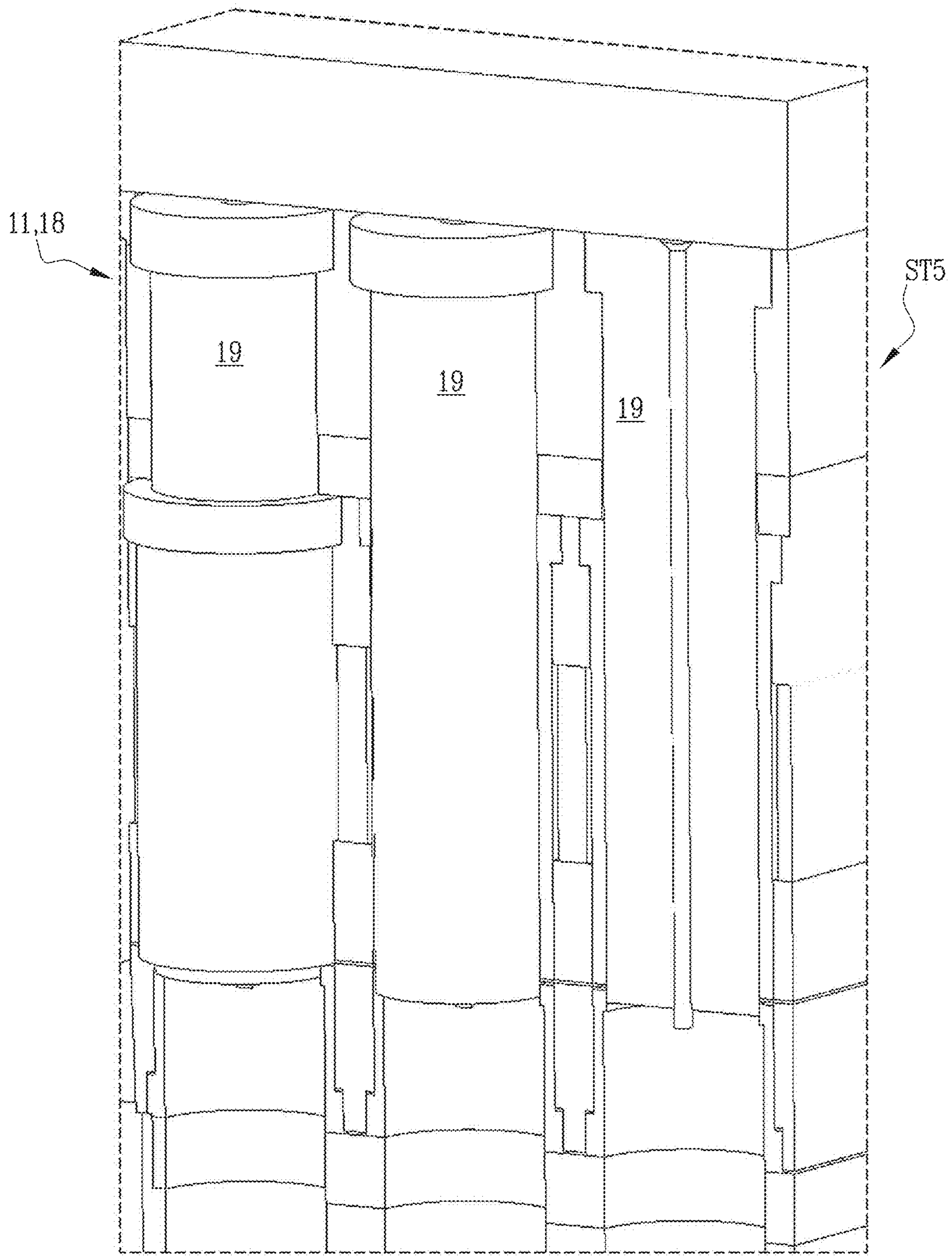
FIG. 9 is a perspective view, according to different cross section planes, of a detail of FIG. 8 relative to a shearing device for making the sealing rings.

The etching means 11 are clearly visible in FIGS. 9 and 10.

Further, the apparatus 100 comprises a plurality of detaching elements 38 configured to detach from the sheet 12 the sealing rings 10 which have been etched on the sheet 12 and move them into contact with the flange 6 in the coupling station ST3.

The detachment means 38 are positioned at the coupling station ST3.

FIG. 10B illustrates a sheet 12 in which, by means of the shearing device 18, the etches have been made relative to the different sealing rings 10: it should be noted that the central portion (disc) of each sheet delimited by the innermost edge of the sealing ring 10 is removed, whilst the line 33 (pre-cutting) of the outermost edge of the sealing ring 10 is illustrated, with a dashed line.

The dashed line 33 of the outermost edge of the respective sealing ring 10 comprises a preferential pre-cutting line 33, defined by actual notches and portions of sheet 12 which allow the ring 10 to be kept coupled to the remaining part of the sheet 12.

It should be noted that the etching means 11 operate at an etching station ST5 (far) and separate from the coupling station ST3 (illustrated in FIGS. 8 and 9), more precisely in an etching station ST5 not superposed on the path of the seats S.

More specifically, in effect, the etching station ST5 does not affect the path of the capsule bodies 8, that is to say, it is not positioned above them. In this way, the waste material generated does not affect the capsule bodies 8, and thus prevents the capsule bodies 8 from being accidentally contaminated with dust.

Figure 11:
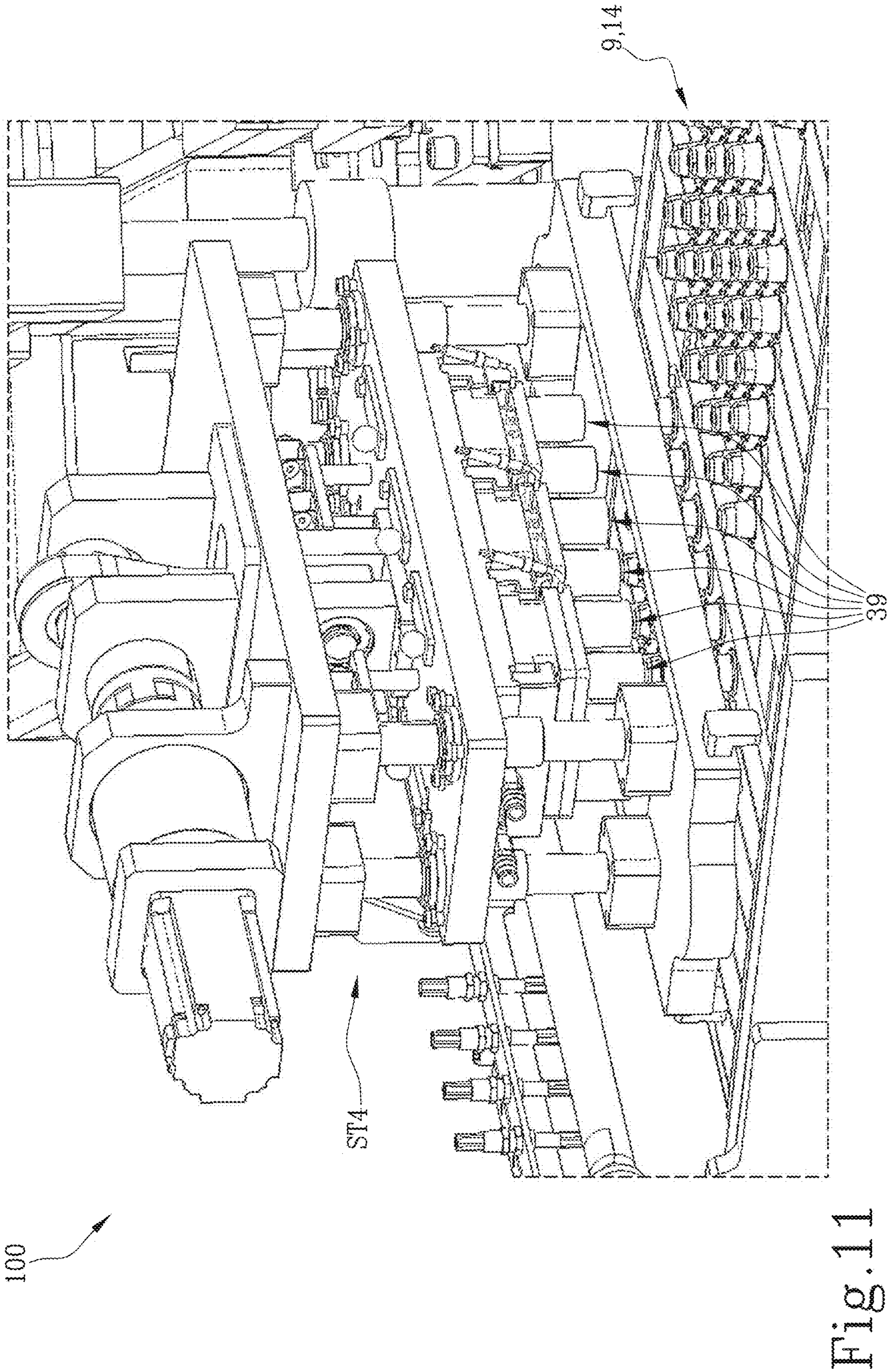

With reference to the sealing station ST4, illustrated in FIGS. 10 and 11, that station comprises a plurality of sealing elements 39.

Each sealing element 39 operates on a capsule body 8.

Preferably, the sealing elements 39 heat seal the sealing ring 10 on the capsule body 8.

According to this aspect, the sealing elements 39 comprise a heating element.

It should be noted that the sealing elements 39 are located above the conveyor 14, and are movable vertically between a non-operating position (illustrated in FIG. 12A), wherein the sealing element 39 is not in contact with the sealing ring 10, and an operating position (illustrated in FIG. 12B), that is to say, a sealing position, wherein the sealing element 39 is in contact with the sealing ring 10 to seal the sealing ring 10 to the capsule body 8.

The sealing station ST4 is configured to allow several groups of seats S (illustrated in FIG. 11) to be activated simultaneously on the capsule bodies 8, preferably three groups of seats S).

The apparatus 100 also comprises a plurality of contact elements 40.

The contact elements 40 are positioned at the sealing station ST4.

The contact elements 40 are shaped to match the cavity 4 of the capsule body 8, and each also has a movable flange 41 configured to abut on the flange 6 of the capsule bodies 8 positioned in the seats S at the sealing station ST4.

Figure 12A:
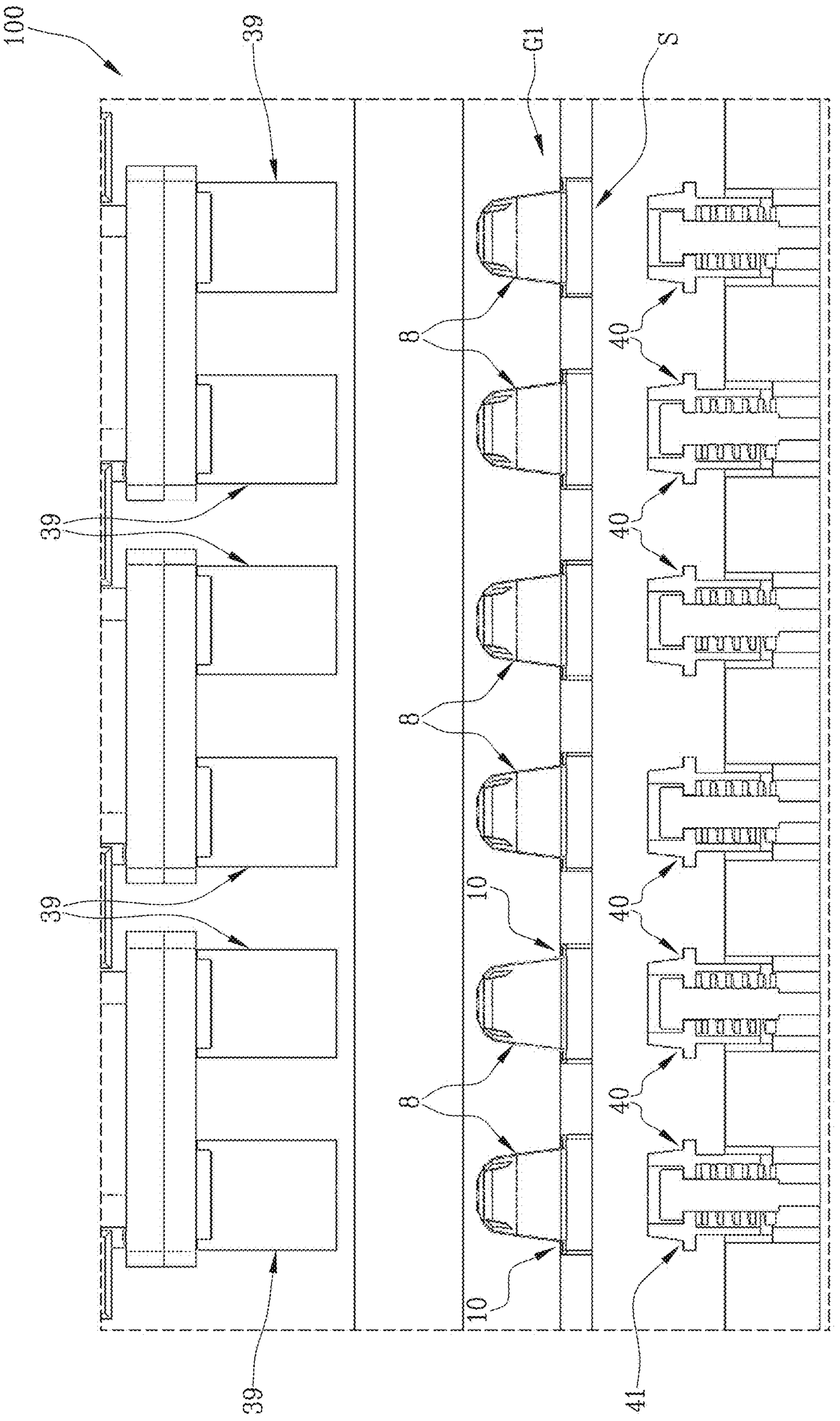
FIGS. 12A and 12B schematically illustrate the station for the sealing of sealing rings for capsules illustrated in FIGS. 10A, 10B and 11 with the elements in different positions.
Figure 12B:
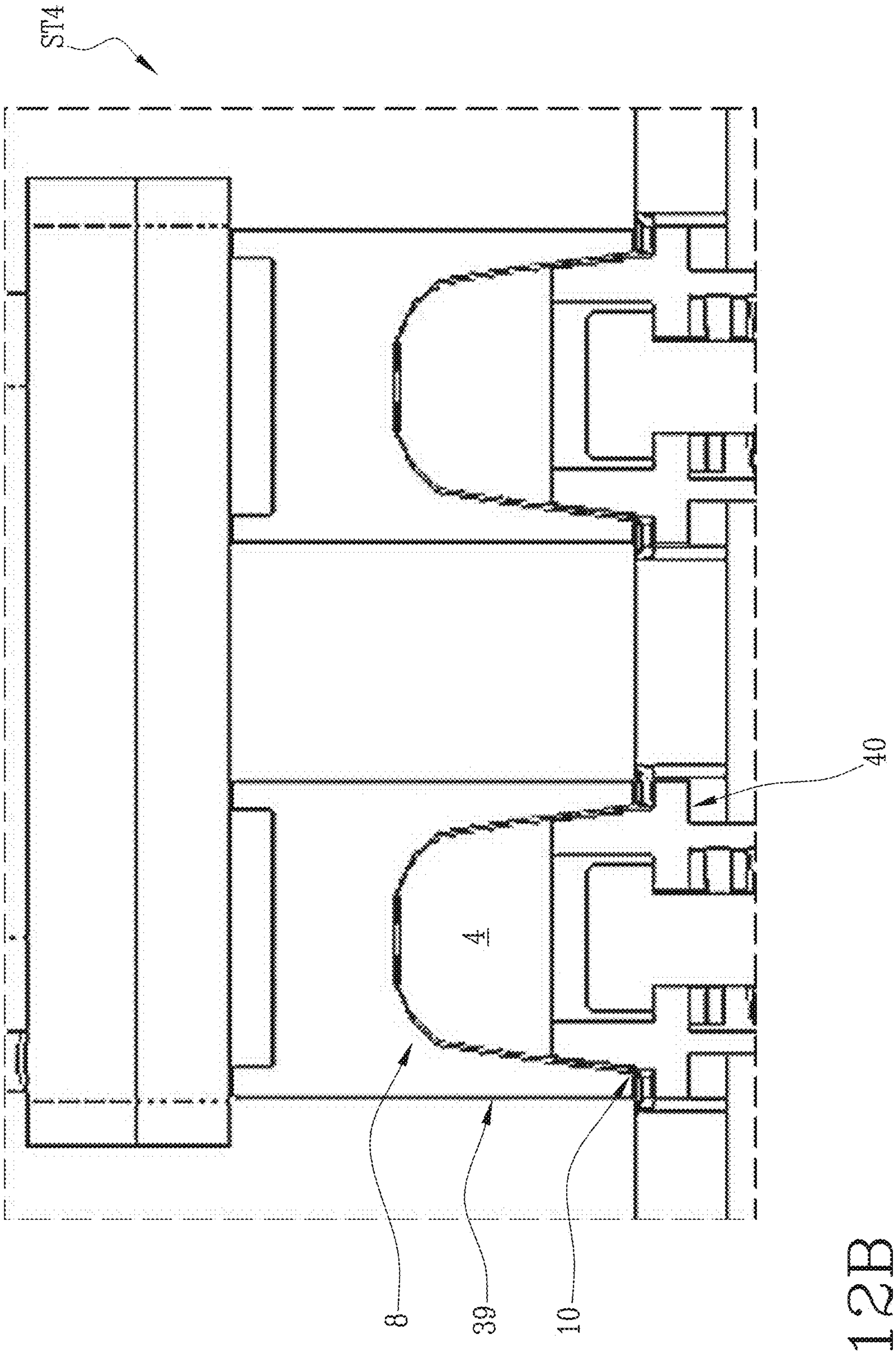

The contact elements 40 are movable vertically between a non-operating position (illustrated in FIG. 12A) and an operating position (illustrated in FIG. 12B).

The contact means 40 are located below the capsule bodies 8.

It should be noted that the capsule bodies 8 are transported by the conveyor 14 in the respective seats S with the opening 5 facing downwards.

In the operating position, illustrated in FIG. 12B, the sealing is performed: in this position the movable flange 41 of each contact element 40 comes into contact with the flange 6 of a capsule body 8 positioned in the seats S and the sealing element 39 comes into contact with the sealing ring 10 to perform the sealing.

According to another aspect, the groups of seats S for receiving said capsule bodies 8 comprise first groups of seats for receiving (G1,G2,G3) and second groups (G4,G5,G6) of seats S for receiving.

These first groups (G1,G2,G3) and second groups (G4,G5,G6) of receiving seats are different and independent from each other with regard to the handling, as described in more detail below.

Figure 4:
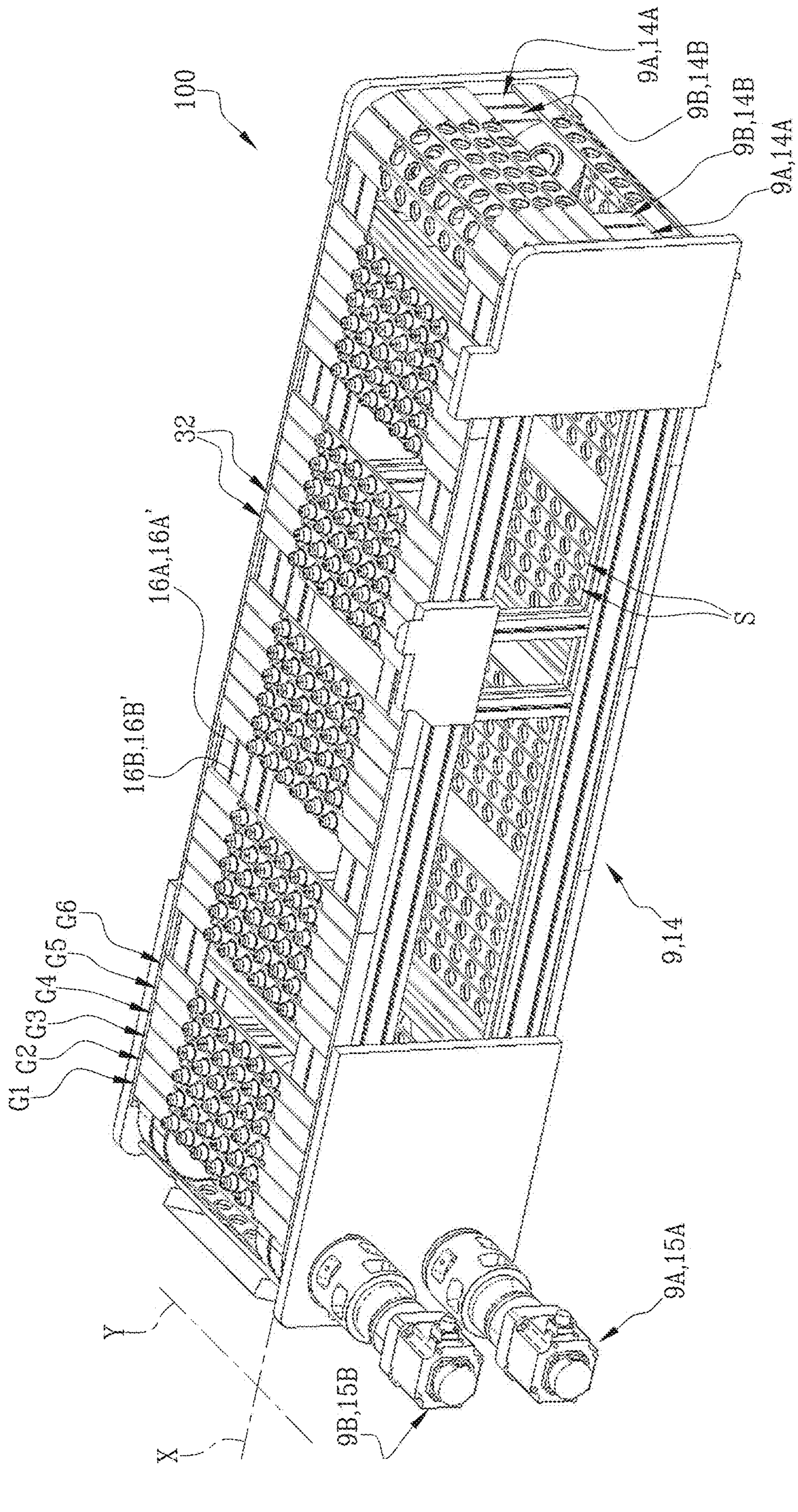
FIG. 4 is a perspective view of certain details of the apparatus of FIG. 1, more specifically a conveyor for transporting capsules forming part of the apparatus of FIG. 1.

In essence, and more precisely, each group of receiving seats, belonging to the first or second groups, comprises seats S aligned in a direction Y transversal to the direction X of conveying the seats (as illustrated in FIG. 4).

More specifically, along the conveying direction X, the first groups (G1,G2,G3) are alternated with the second groups (G4,G5,G6), that is to say, along the conveying direction X there is an alternation of first and second groups of seats S.

It should be noted that the means 9 for handling the groups of receiving seats S comprise first handling means 9A, operating on said first groups (G1,G2,G3) of receiving seats S, and second handling means 9B, operating on said second groups (G4,G5,G6) of receiving seats S.

The first and second handling means 9A, 9B are independent of each other, to allow an independent handling, respectively, of said first groups (G1,G2,G3) and second groups (G4,G5,G6) of receiving seats S.

In short, the operation of the first groups (G1,G2,G3) and the second groups (G4,G5,G6) of receiving seats S is independent of each other, as described in more detail below.

It should be noted that the apparatus 100 comprises a control unit 13 configured to control the first and second handling means 9A, 9B in such a way as to allow a step-by-step handling, respectively, of the first groups (G1,G2,G3) and second groups (G4,G5,G6) of receiving seats S.

The expression step-by-step handling is used to mean a handling wherein the first and second handling means 9A, 9B are periodically started/stopped according to a predetermined time frequency (corresponding to a step).

More precisely, the control unit 13 is configured for controlling said first and second handling means 9A, 9B in such a way as to allow a handling of the receiving seats S in accordance with the following time sequence which is cyclically repeated:

- a first motion phase, wherein said first handling means (9A) are active while said second handling means (9B) are inactive, so as to move said first groups (G1,G2,G3) of seats (S) closer to the second groups (G4,G5,G6) of seats (S); followed by
- a second motion phase, wherein said first handling means (9A) are active and said second handling means (9B) are simultaneously active, so as to move said first groups (G1,G2,G3) and second groups (G4,G5,G6) of seats (S) simultaneously; followed by
- a third motion phase, wherein said second handling means (9B) are active while said first handling means (9A) are inactive, so as to move said second groups (G4,G5,G6) of seats (S) away from said first groups (G1,G2,G3) of seats (S).

The time sequence described above is repeated cyclically, so as to move each group of seats S between the various stations.

In effect, the groups (G1,G2,G3,G4,G5,G6) of seats S are moved along a closed path, preferably a loop-shaped path (defined by the conveyor 14), so that they cyclically come into contact with the various stations receiving a capsule body 8 and performing on it the operations which will be described in more detail below.

The handling means 9 are described below in more detail.

As illustrated in FIG. 4, the handling means 9 comprise a loop conveyor 14 configured to define a closed-loop path P for handling the groups of receiving seats S.

More specifically, the first handling means 9A comprise a first loop conveyor 14A, configured to define a first closed-loop path for handling the first groups (G1,G2,G3) of receiving seats.

The second handling means 9B comprise a second loop conveyor 14B, configured to define a second closed-loop path for handling the second groups (G4,G5,G6) of receiving seats S.

It should be noted that, in effect, the first and second loop paths are coincident.

The first conveyor 14A comprises a first drive unit 15A and first belts 16A extending in a loop.

The first belts 16A comprise a pair of belts, 16A' and 16A", positioned, relative to the conveying direction X of the seats S, on opposite sides.

The first belts 16A are connected to the first drive unit 15A for being driven and to the first groups (G1,G2,G3) of receiving seats for handling them.

Similarly, the second conveyor 14A comprises a second drive unit 15B and second belts 16B.

The second belts 16B comprise a pair of belts, 16B' and 16B", positioned, relative to the conveying direction X of the seats S, on opposite sides.

The second belts 16B extend in a loop and are connected to the second drive unit 15B for being actuated.

It should be noted that the second belts 16B are positioned alongside said first belts 16A and connected to the second groups of receiving seats S for handling the receiving seats S.

More specifically, the belt 16A' is alongside the belt 16B' and the belt 16A" is alongside the belt 16B".

With reference to the longitudinal conveying direction X of the receiving seats S, the first belts 16A are positioned substantially parallel, at a predetermined distance along the transversal direction Y.

Similarly, with reference to the longitudinal conveying direction X of the receiving seats S, the first belts 16A are positioned substantially parallel, at a predetermined distance along the transversal direction Y.

Each group (G1,G2,G3,G4,G5,G6) of seats S comprises a respective connecting body 32, in which the seats S are made and is connected on both sides to the first belts 16A or, alternatively, to the second belts 16B.

The seat S is shaped in such a way as to house the capsule body 8 with the opening 5 positioned downwards.

The various stations, respectively the station ST1 for receiving capsule bodies 8, the station ST3 for coupling said sealing rings 10 with the respective capsule bodies 8, the sealing station ST4, are positioned at the first and the second conveyor 14A and 14B, that is to say, they affect areas connected to the conveyors 14A and 14B.

On the other hand, the etching station ST5 is positioned in a spatial region which does not affect the first and second conveyors 14A and 14B.

In this way, advantageously, the waste generated during the etching by the etching means 9 does not affect the region of the conveyors 14A and 14B, where the capsule bodies 8 are positioned in the respective seats S, thus increasing overall the cleaning, efficiency and food safety of the apparatus 100.

In effect, it should be noted that the first loop conveyor 14A and the second loop conveyor 14B are configured in such a way that the path of the first group of seats S and of the second group of seats S is substantially coincident.

According to another aspect, the feeding device 7 comprises a roller 17 for supporting and unwinding the reel B (as illustrated in FIG. 6).

The sheet 12 is a sheet generally made of paper material.

It should be noted that the feeding device 7 is configured to unwind the reel B at a constant speed without stopping, whilst the etching means 11 operate with the sheet stationary.

In essence, according to the apparatus 100, in a predetermined region 33 corresponding to the etching station ST5, the sheet 12 can be stopped, whilst it is generally unwound continuously from the reel B.

In this regard, in order to allow operation in this way, the apparatus 100 comprises a compensation zone 30 of variable length along the sheet 12 feeding path.

In the compensation zone 30, therefore, the sheet 12 has a length along the unwinding path which is variable from a minimum to a maximum: the maximum length is reached when the sheet 12 is stationary at the etching station ST5, to be etched by the etching means 9, and the reel B is simultaneously unwound (its unwinding having caused the elongation in the compensation zone 30).

Figure 7:
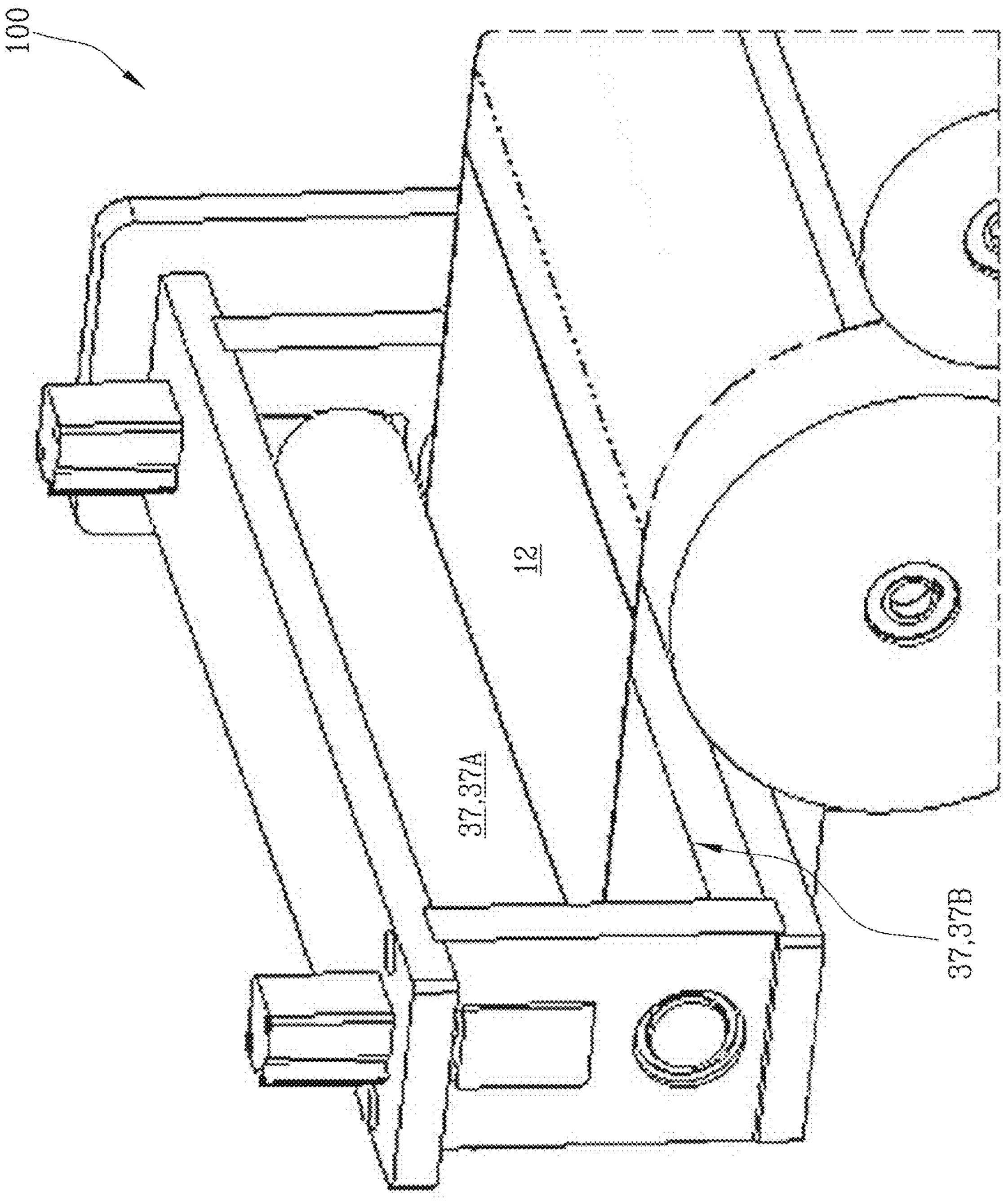
FIG. 7 is a perspective view of certain details of the apparatus of FIG. 1, more specifically a second zone relative to the station for making sealing rings for capsules of the apparatus of FIG. 1.

FIG. 7 illustrates, on the other hand, auxiliary means 37 for pulling the sheet 12, upstream of the etching station ST5, forming part of the apparatus 100.

The auxiliary means 37 comprise at least one pair of rollers 37A and 37B.

Preferably, the auxiliary drive means 37 may be coupled to or uncoupled from the sheet 12.

Figure 13:
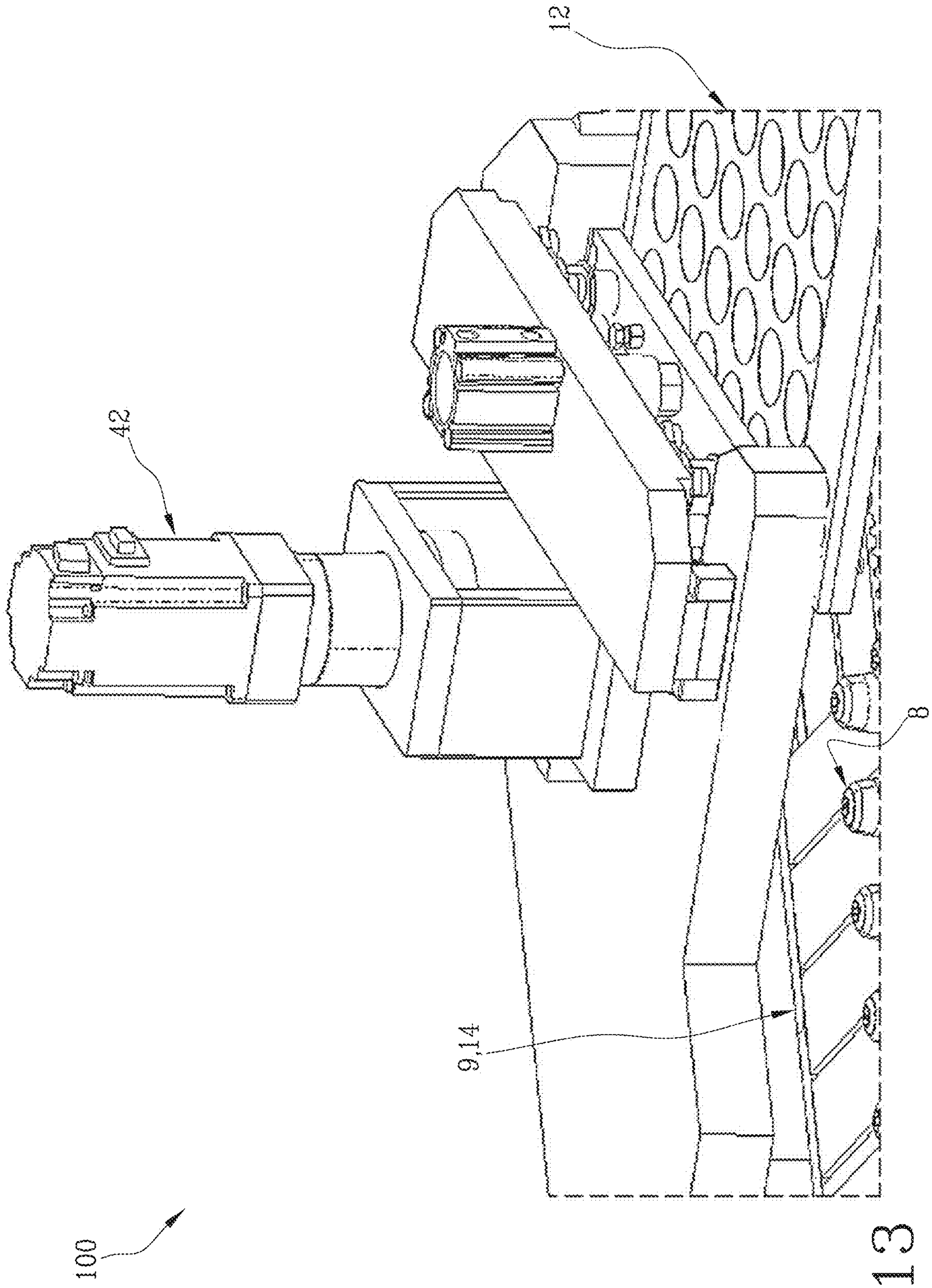
FIGS. 13 and 14 are perspective views of certain details of the apparatus of FIG. 1.
Figure 14:
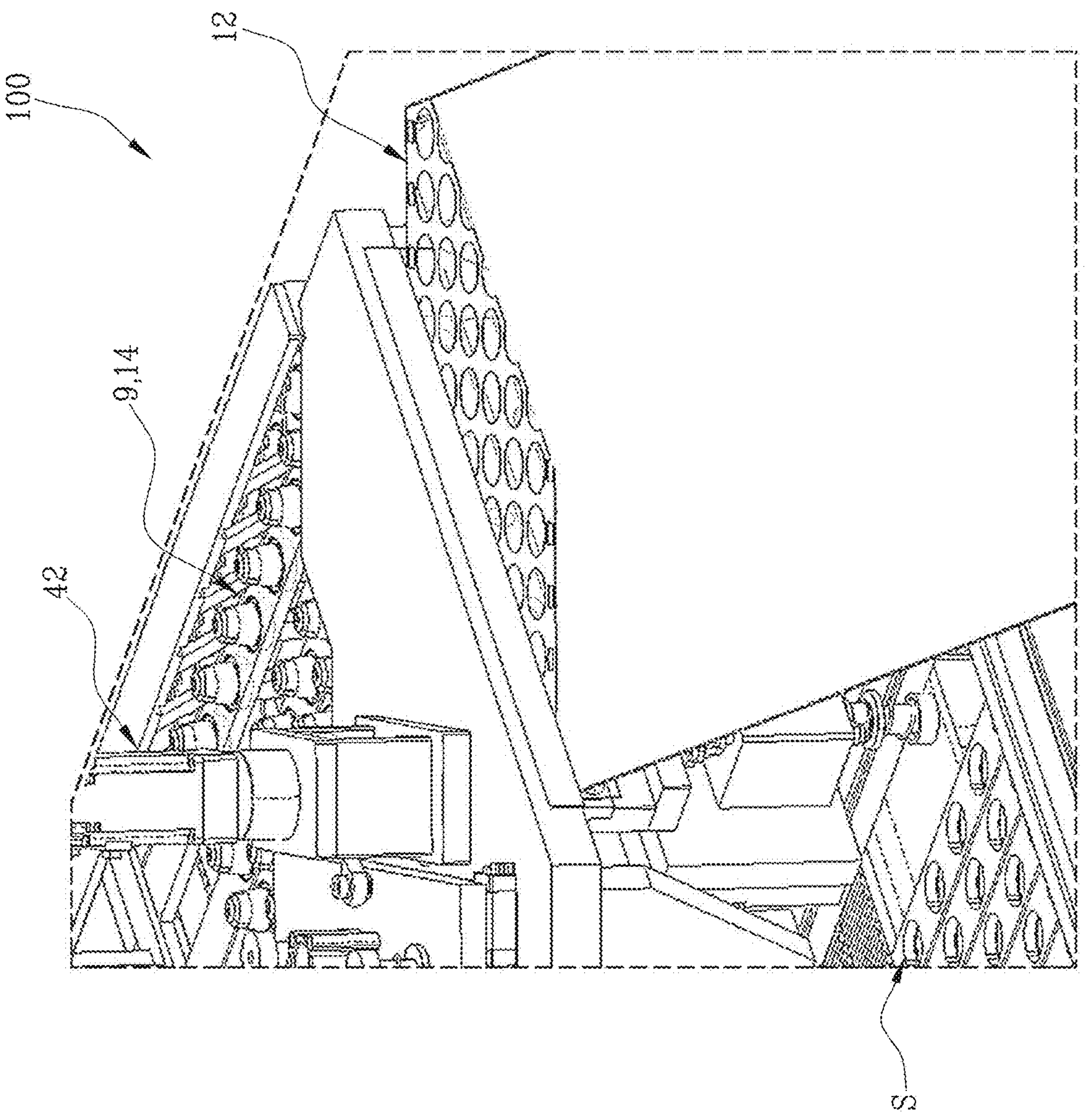

The apparatus 100 further comprises main means 42 for driving the sheet 12, illustrated in FIGS. 13 and 14, positioned preferably downstream of the etching station ST5.

The means 42 for driving the sheet 12 preferably comprise a motor, preferably of the brushless type.

Moreover, preferably, the apparatus 100 comprises a winding reel, not illustrated, configured to wind the remaining portion of the sheet 12, etched in the etching station ST5, in which the rings 10 have been made.

According to another aspect, the control unit 13 is configured to rotate the supporting and unwinding roller 17 at a constant and coordinated speed with the handling means 9 of the receiving seats G.

In effect, the apparatus 100 comprises a drive unit (not illustrated) operatively connected to the supporting roller 17 to allow its rotation, and the control unit 13 is connected to the drive unit.

According to another aspect, the etching means 11 comprise a shearing device 18, comprising a plurality of cutting elements 19 which can be activated on said sheet 12 for etching it and defining a plurality of shapes defining said sealing rings 10.

Figure 8:
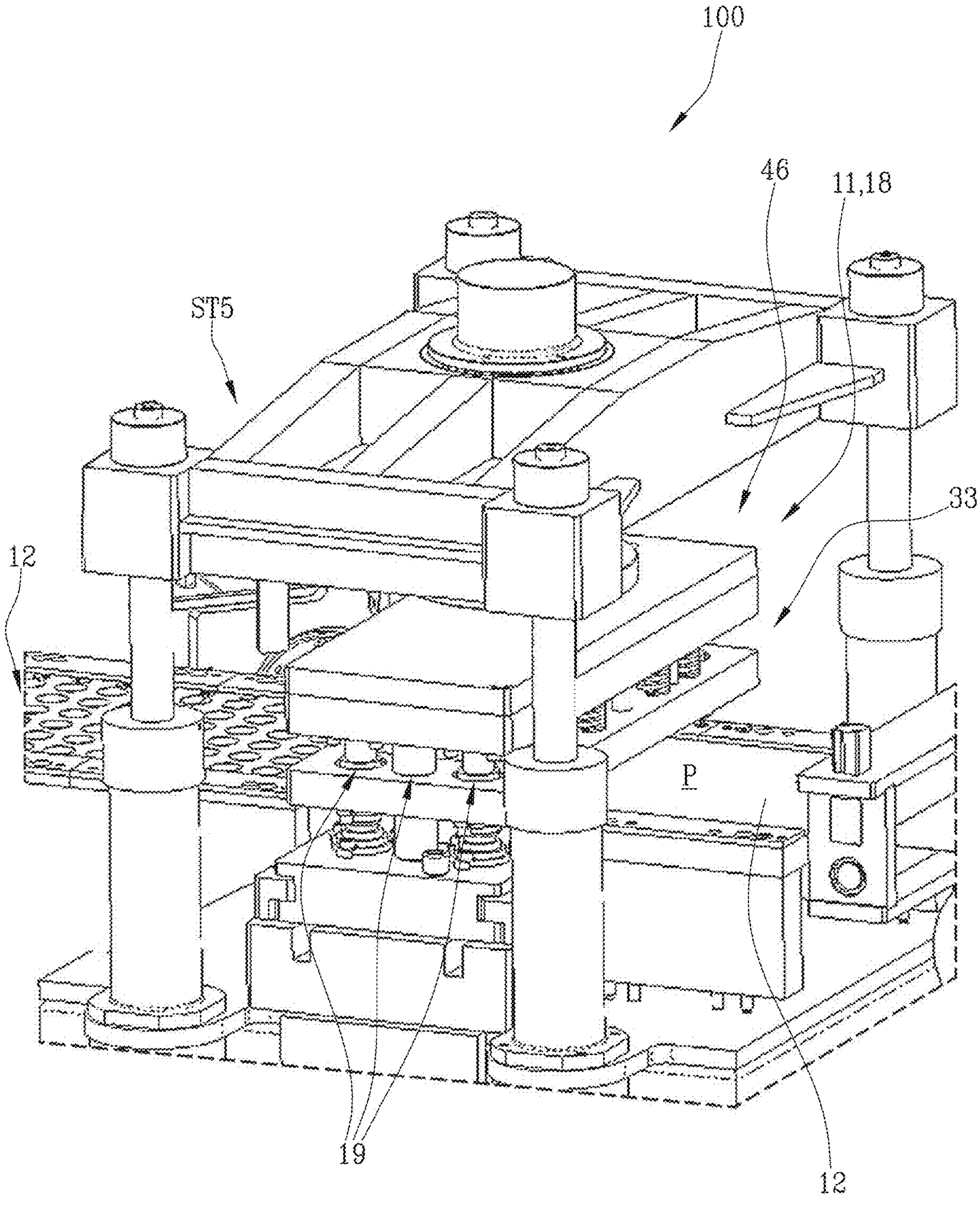
FIG. 8 is a perspective view of certain details of the apparatus of FIG. 1, more specifically a third zone relative to the station for making sealing rings for capsules of the apparatus of FIG. 1.

The shearing device 18 is illustrated in FIGS. 8 and 9.

According to an aspect, said shearing device 18 is configured in such a way that the cutting elements 19 operate in a cutting plane P in a substantially planar portion of said sheet 12.

It should be noted that the shearing device 18 does not in any way affect the region above the conveyor 14: in this way, the waste and/or dust generated during shearing does not affect the capsules.

According to an aspect, the shearing device 18 operates on a portion of the sheet 12 stopped (that is to say, under stationary conditions) below the shearing device 18.

According to another aspect, at the etching station ST5, the apparatus 100 comprises a suction device 46, configured to act on the sheet 12 in such a way as to detach the central portions from the sealing rings 10 etched on the sheet 12.

According to an embodiment not illustrated, the etching means 11 comprise a pair of rotary etching elements, acting in conjunction with each other to etch the sheet 12 and make the shapes of the sealing rings 10 on it. According to this embodiment, not illustrated, it should be noted that one of said rotary elements is equipped with etching elements defining punches (i.e. "knives") and the other of said rotary elements is provided with cavities, configured to receive said etching elements, defining a die.

The sheet 12 is interposed between said rotary elements. These rotary units substantially operate the etching of the sheet 12 during their rotation, in a coordinated fashion, that is to say, preferably the sheet 12 is not stopped and the rotary units perform the etching during the pulling of the sheet 12.

According to another aspect, the apparatus 100 comprises a device 21 for controlling the sealing rings 10 configured for detecting, after the etching, a parameter inherent to a shape and/or a colour and/or a presence/absence of said sealing rings 10 on said sheet 12.

According to yet another aspect, the apparatus 100 comprises a device 22 for controlling the capsule bodies 8 configured for detecting a parameter inherent to a shape and/or a colour and/or a presence/absence of the capsule bodies 8 in said receiving seats S.

According to yet another aspect, the apparatus 100 comprises a device 23 for controlling the sealing configured for detecting a parameter inherent to a shape and/or a colour and/or a presence/absence of an assembly defined by the capsule body 8 and the sealing ring 10 sealed to each other, said sealing control device 23 being positioned downstream of the sealing station ST4.

According to yet another aspect, the apparatus 100 comprises a device 44 for controlling the correct coupling of the sealing ring 10 on the capsule body 8, positioned downstream of, or at, the coupling station ST3 to check if each sealing ring 10 has been correctly coupled on the relative capsule body.

Advantageously, the apparatus 100 is particularly efficient in allowing the production of capsules, guaranteeing an optimum cleaning and conditions with a high level of food safety and hygiene.

Figure 5:
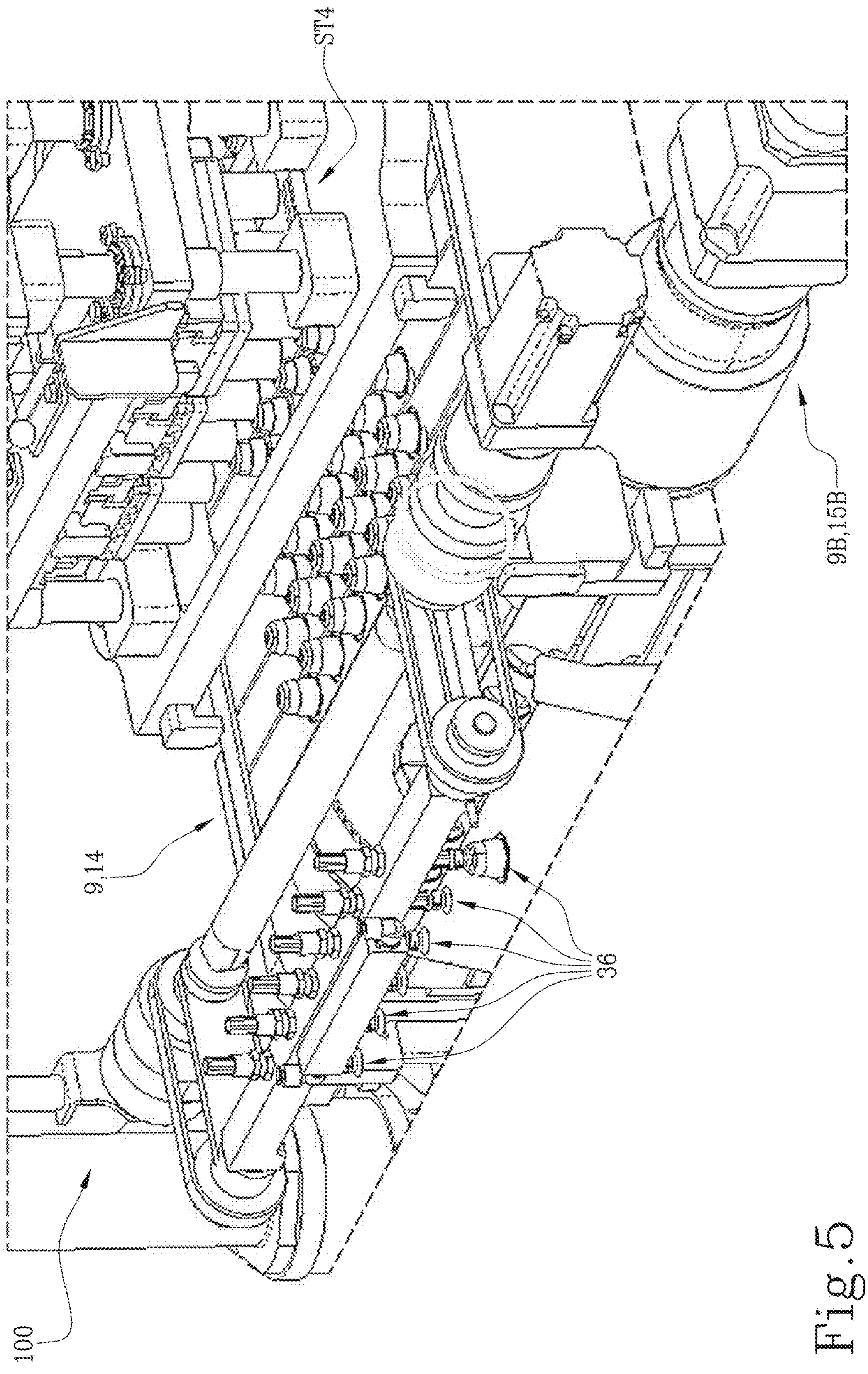
FIG. 5 is a perspective view of certain details of the apparatus of FIG. 1, more specifically a zone for releasing the capsules made by the apparatus of FIG. 1.

With reference to FIG. 5, the apparatus 100 comprises a pickup device 36, configured for picking up the capsule bodies 8 to which the sealing ring 10 has been applied by the conveyor 14, more specifically by the seats S.

The pickup device 36 releases the capsules to a subsequent transport line (not illustrated), for the storage and/or packaging.

According to another aspect, a method is defined for making capsules, comprising the following steps:

preparing a plurality of capsule bodies 8, provided with a bottom 2 and side walls 3 defining, in combination, a filling cavity 4 provided with an opening 5 opposite the bottom 2 and a flange 6 positioned to surround said opening 5;

arranging said capsule bodies 8 inside groups of receiving seats S;

moving said groups of receiving seats S along a feed path, preferably in a closed loop;

preparing a reel B of sheet material (preferably paper) and unwinding said reel B to make available a sheet 12;

obtaining sealing rings 10 from said sheet 12;

coupling in a coupling station ST3 each sealing ring 10 to the respective capsule body 8 at the respective flange 6;

sealing each sealing ring 10 to the body 8 on which it is inserted, and wherein the step of obtaining capsule sealing rings 10 from said sheet 12 includes the sub-step of etching the sheet 12 by creating pre-cutting lines 33 along edges of said sealing rings 10, so that a central portion of the sealing rings 10 having a discoidal shape is detached from the etched sheet 12, while the sealing rings 10 remain anchored to the sheet 12 by means of anchor points present in the pre-cutting lines 33.

The step of coupling in a coupling station ST3 each sealing ring 10 to the respective capsule body 8 is preceded by a step of detaching from the sheet 12 the sealing rings 10 which had been etched on the sheet 12.

The sub-step of etching the sheet 12 is performed in an etching ST5 far from and separate from the coupling station ST3, where the step of detaching the sealing rings 10 from the sheet 12 is performed.

According to another aspect, the step of positioning the capsule bodies 8 inside groups of receiving seats S comprises a step of positioning a first portion of said capsule bodies 8 inside first groups (G1,G2,G3) of receiving seats and a second portion of said capsule bodies 8 inside second groups (G4,G5,G6) of receiving seats.

Moreover, the step of moving the groups of receiving seats S along the feeding path comprises a step of handling independently said first groups (G1,G2,G3) of receiving seats relative to the second groups (G4,G5,G6) of receiving seats S.

According to another aspect, the step of moving said groups of receiving seats S along the feeding path is performed with a step-by-step movement.

In other words, the step-by-step handling presupposes, over time, stoppages of the groups (G1,G2,G3,G4,G5,G6) of seats S at the different stations or processing devices, to allow simultaneous processing on different groups of capsule bodies 8. Generally speaking, during the stoppages, processing or activities are performed on capsule bodies 8 which are stationary at different stations/regions.

According to another aspect, the step of moving said groups of receiving seats S along the feeding path comprises the following steps, in the following time sequence, which is repeated cyclically:

moving said first groups (G1,G2,G3) of receiving seats S closer to the second groups (G4,G5,G6) of receiving seats S; then moving at the same time said first groups (G1,G2,G3) of receiving seats S and said second groups (G4,G5,G6) of receiving seats S; then moving said second groups (G4,G5,G6) of receiving seats S away from the first groups (G1,G2,G3) of receiving seats S.

It should be noted that, preferably, the step of simultaneously moving said first groups (G1,G2,G3) of receiving seats S and said second groups (G4,G5,G6) of receiving seats S comprises an n number of steps, whilst the step of moving the first groups (G1,G2,G3) of receiving seats S towards the second groups (G4,G5,G6) of receiving seats S comprises an m number of steps. According to an aspect, n>1 m>1 and m>n.

According to this aspect, during the movement of the first groups (G1,G2,G3) of receiving seats S towards the second groups (G4,G5,G6) of receiving seats S, a portion of the second groups (G4,G5,G6) of receiving seats S is kept at the sealing station ST4. According to another aspect, the step of moving said first groups (G1,G2,G3) of receiving seats closer to the second groups of receiving seats S is performed by keeping said second groups (G4,G5,G6) of receiving seats in a fixed position, and the step of moving said second groups (G4,G5,G6) of receiving seats S away from the first groups (G1,G2,G3) of receiving seats S is performed by keeping said first groups (G1,G2,G3) of receiving seats S in a fixed position.

According to a yet further aspect, the step of etching said sheet 12 to determine sealing rings 10 occurs with the sheet 12 in a stoppage position, whilst the reel B continues to unwind (without stopping).

According to another aspect, the step of unwinding said reel B occurs at a constant speed.

According to a further aspect, the step of etching said sheet 12 to determine sealing rings 10 defined on said sheet 12 with pre-cutting lines 33 comprises a step of shearing said sheet 12 using a plurality of shearing elements 19 for defining, on said reel B, a corresponding plurality of shapes of sealing rings 10.

Further, according to another aspect, during the step of cutting the shapes of the sealing rings 10 from the sheet 12, the shearing elements 19 operate in a cutting plane P on a portion of the sheet 12 of said substantially planar reel B.

According to another aspect, the step of detaching said sealing rings 10 from the sheet 12 comprises a step of sucking the sealing rings 10, in such a way as to detach the sealing rings 10 etched in the reel B.

According to another aspect, the method further comprises a step of controlling the sealing rings 10, wherein a parameter inherent to a shape and/or a colour of said sealing rings 10 is detected.

Further, the method comprises a step of controlling said capsule bodies 8, wherein a parameter inherent to a shape and/or a colour of the capsule bodies 8 is detected.

According to another aspect, the method further comprises a step of controlling the sealing, wherein a shape and/or colour parameter of an assembly defined by the capsule bodies 8 and sealing rings 10 sealed to each other is detected.

According to another aspect, the step of coupling the sealing ring 10 to the capsule body 8 is performed by mutually moving the sealing ring 10 and the capsule body 8 along a vertical direction (more specifically, the capsule body 8 is kept in a predetermined vertical position whilst the sealing ring 10 is moved vertically).

It should be noted that the step of positioning said capsule bodies 8 inside groups of receiving seats S is performed by placing inside the seats S the capsule bodies 8 resting, respectively, with the flanges 6 below and the bottoms 2 at the top.

Advantageously, the proposed method for making capsules is particularly simple, and effective in terms of cleanliness and food safety.

The invention claimed is:

1. An apparatus for making capsules, the apparatus comprising:

a receiving station for receiving capsule bodies each having a bottom and side walls defining, in combination, a filling cavity provided with an opening opposite the bottom and a flange surrounding said opening;

a forming station for making sealing rings, the forming station comprising a feeding device for feeding a sheet unwound from a reel;

a coupling station for coupling said sealing rings with respective capsule bodies, the coupling station being configured to couple each sealing ring to a respective flange of a respective one of the capsule bodies;

a welding station configured to weld said sealing rings to respective ones of said capsule bodies;

a plurality of groups of receiving seats for receiving said capsule bodies and a handling device for handling of said groups of receiving seats, the handling device including a conveyor configured to allow handling of the capsule bodies between the receiving station, the coupling station, and the welding station;

an etching device configured to etch the sheet forming pre-cutting lines along edges of said sealing rings, so that central portions of the sealing rings are detached from the etched sheet, while the sealing rings remain anchored to the sheet by means of anchor points spaced by the pre-cutting lines; and a plurality of detaching elements configured to detach from the sheet the sealing rings and bring the sealing rings into contact with the flanges of the capsule bodies at the coupling station, the etching device operating at an etching station remote and separate from the coupling station.

2. The apparatus according to claim 1, wherein said groups of receiving seats comprise first groups of receiving seats and second groups of receiving seats, and wherein the handling device comprises a first handling device operating said first groups of receiving seats, and a second handling device operating said second groups of receiving seats, said first and second handling devices being independent from each other to allow an independent movement of said first and second groups of receiving seats, respectively.

3. The apparatus according to claim 2, further comprising a control unit configured to control said first and second handling devices to allow a movement of the receiving seats in accordance with the following cyclically repeating sequence:

a first phase of motion, in which said first handling device is active while said second handling device is inactive, to move said first groups of receiving seats closer to the second groups of receiving seats; followed by a second phase of motion, in which said first handling device is active and said second handling device is simultaneously active, to move said first groups of receiving seats and said second groups of receiving seats simultaneously; followed by a third phase of motion, in which said second handling device is active while said first handling device is inactive, to move said second groups of receiving seats away from said first groups of receiving seats.

4. The apparatus according to claim 2, wherein said first handling device comprises a first loop conveyor configured to define a first handling closed loop path for the first groups of receiving seats, and wherein said second handling device comprises a second loop conveyor configured to define a second handling closed loop path for the second groups of receiving seats, said first and second handling closed loop paths being parallel.

5. The apparatus according to claim 4, wherein said first loop conveyor comprises first belts developing along a first loop and driven by a first drive, said first groups of receiving seats being connected to the first belts to move with the first belts, and wherein said second loop conveyor comprises second belts developing along a second loop and driven by a second drive, said second groups of receiving seats being connected to the second belts to move with the second belts, the first belts and the second belts being arranged side by side.

6. The apparatus according to claim 1, wherein the feeding device comprises a supporting roller for supporting and unwinding the reel, said feeding device being configured to unwind the reel at a constant speed, while the etching device operates on the sheet at a standstill.

7. The apparatus according to claim 1, wherein the etching device comprises a shear which comprises a plurality of cutting elements operable on said sheet for etching the sheet and defining said sealing rings.

8. The apparatus according to claim 1, wherein the apparatus comprises a suction device configured to act on the sheet to detach the central portions from the sealing rings.

9. A method for making capsules, the method comprising the following steps:

providing a plurality of capsule bodies each having a bottom and side walls defining, in combination, a filling cavity provided with an opening opposite the bottom and a flange arranged to surround said opening;

arranging said capsule bodies inside groups of receiving seats;

moving said groups of receiving seats along an advancement path in a closed loop;

providing a reel and unwinding said reel to make available a sheet;

obtaining sealing rings from said sheet;

coupling in a coupling station each sealing ring to a respective flange of a respective one of the capsule bodies;

welding each sealing ring to the respective one of the capsule bodies to which each sealing ring is coupled, wherein the step of obtaining the sealing rings from said sheet includes a sub-step of etching the sheet by creating pre-cutting lines along edges of said sealing rings, so that central portions of the sealing rings having a discoidal shape are detached from the etched sheet while the sealing rings remain anchored to the sheet by anchor points spaced by the pre-cutting lines, and wherein the step of coupling in the coupling station is preceded by a step of detaching from the sheet the sealing rings, the sub-step of etching the sheet being carried out in an etching station remote and separate from the coupling station.

10. The method according to claim 9, wherein the step of arranging said capsule bodies inside the groups of receiving seats comprises a step of arranging first portions of said capsule bodies within first groups of receiving seats and second portions of said capsule bodies within second groups of receiving seats, and wherein the step of moving said groups of receiving seats along the advancement path comprises a step of independently moving said first groups of receiving seats with respect to said second groups of receiving seats.

11. The method according to claim 10, wherein the step of moving said groups of receiving seats along the advancement path is carried out stepwise and comprises the following steps, in the following cyclically repeating sequence:

moving said first groups of receiving seats closer to the second groups of receiving seats; then moving at the same time said first groups of receiving seats and said second groups of receiving seats; then moving said second groups of receiving seats away from the first groups of receiving seats.

12. The method according to claim 11, wherein the step of moving said first groups of receiving seats closer to said second groups of receiving seats is performed by keeping said second groups of receiving seats in a fixed position, and the step of moving said second groups of receiving seats away from the first groups of receiving seats is performed by keeping said first groups of receiving seats in a fixed position.

13. The method according to claim 9, wherein the sub-step of etching said sheet comprises a step of blanking said sheet by a plurality of cutting elements to define, on said sheet, said sealing rings.

14. The method according to claim 9, wherein the step of detaching from the sheet the sealing rings comprises a step of suctioning said sealing rings to detach said sealing rings from the sheet.

* * * * *